Nov. 22, 1927.
C. L. MAGEE
1,650,021
LUBRICANT FILLING DEVICE
Filed Nov. 8, 1919
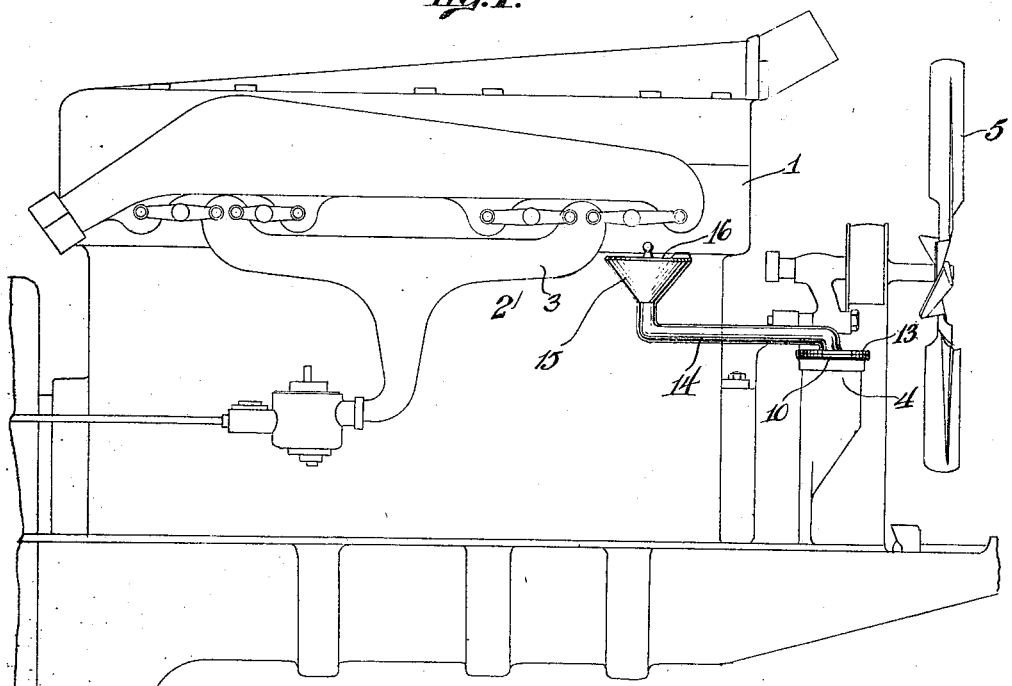
Fig. 1.
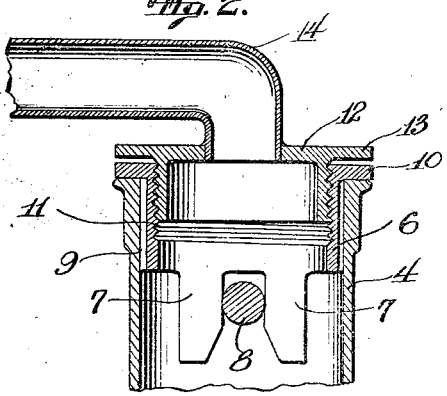
Fig. 2.
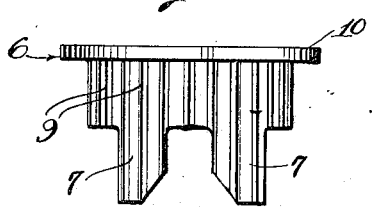
Fig. 4.
Fig. 3.
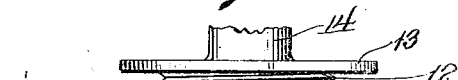
Fig. 5.
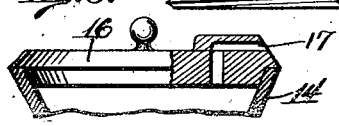
Fig. 6.
Inventor
C. L. Magee
By Edgar M. Kitchin
his Attorney Patented Nov. 22, 1927.

1,650,021

UNITED STATES PATENT OFFICE.

CHARLES L. MAGEE, OF WASHINGTON, DISTRICT OF COLUMBIA.

LUBRICANT-FILLING DEVICE.

Application filed November 8, 1919. Serial No. 336,687.

This invention relates to improvements in internal combustion engines, and more particularly to the lubricating features thereof, and has as its object facilitation of the introduction of lubricant to the crank housing of such an engine.

It is the customary practice to introduce lubricant to the crank housing of an automobile engine through the breather tube thereof, but in various makes of automobiles this tube is located at an almost inaccessible point rendering necessary the employment of either a flexible tube for the introduction of the lubricant or a specially constructed tube and funnel. As frequently happens, such special apparatus is not at hand and the operator endeavors to introduce the oil from an ordinary container with the result that some of the oil fails to enter the tube and finds its way down about the base of the engine and into the pan beneath. The oil is thus worse than wasted, because it saturates the insulation of any nearby conductors, as for instance those of the commutator and lights, causing deterioration thereof and short circuiting of the wires. The waste oil also causes objectionable dripping from the pan and a collection of dirt and filth about the base of the engine. The present invention obviates all such objectionable results.

With these and further objects in view as will in part hereinafter become apparent and in part be stated, the invention comprises certain novel constructions, combinations and arrangements of parts as subsequently specified and claimed.

In the accompanying drawing,—

Figure 1 is a view in side elevation of an internal combustion engine embodying the features of the present invention.

Figure 2 is an enlarged, detail, fragmentary vertical section through the breather tube and its improved connections.

Figure 3 is a view in side elevation of a fragment of the funnel tube detached.

Figure 4 is a view in side elevation of the connection sleeve detached.

Figure 5 is a plan view of the sleeve seen in Figure 4, parts of the flange being broken away to show a portion of the body of the sleeve in horizontal section.

Figure 6 is a detail, fragmentary vertical section through a part of the filler funnel showing the cover thereof partly in section and partly in elevation.

Referring to the drawing by numerals, 1 indicates the cylinder block, 2 the crank housing, 3 the intake tube, 4 the breather tube, and 5 the fan of an automobile engine. The radiator is not illustrated, but in engines of this type appears immediately in front of the fan 5 and sufficiently close to the breather tube 4 to render direct delivery of lubricant to the tube 4 from an ordinary receptacle quite difficult. The tube 4 is usually provided in common usage with a cap which substantially closes the tube but leaves an opening or openings for the passage of air for avoiding resistance to the piston strokes. This cap is not shown since in the present invention it is not employed but in its stead is arranged a means of delivery of oil to the tube 4 which obviates difficulty in supplying the oil to the tube and does not interfere, during the regular running of the engine, with the functions of the tube 4 as a breather.

Within the upper end of the breather tube 4 is arranged a connecting sleeve 6 which is held rigidly within the tube 4 against angular or creeping movement. To effect this rigid retention of the sleeve 6, the lower portion thereof is provided with pendent fingers 7, 7, spaced to accommodate therebetween the bolt 8 which is found present in the breather tube 4 of many of the engines now in use. The fingers 7 are preferably arranged in diametrically opposite pairs, but it is obvious that a single pair would effectively function to prevent angular movement of the sleeve. Since some of the engines in use, however, are not provided with the bolt 8, the sleeve 6 is preferably fluted at 9, 9, and proportioned to have the flutings 9 serve as biting teeth penetrating the inner surface of the tube 4 sufficiently to prevent rotary movement of the sleeve 6 during operation. The upper end of the sleeve 6 is preferably provided with an outstanding annular flange 10, which is caused to rest upon the upper edge of the tube 4. The sleeve 6 is internally threaded at 11, and meshing with the threads 11 are the external threads of a tubular cap 12 having a flange 13. The cap 12 is in fact the lower terminus of a filling tube 14 which is bent to substantially a right angle immediately above the cap 12 and again bent to an upright position at its outer or free end where it terminates in an upwardly opening funnel 15.

In assembling the parts the cap 12 is screwed down into the sleeve 6 before the sleeve is applied in the tube 4. The cap 12 is preferably threaded down into the sleeve to approximately the position indicated in Figure 2 with the flange 13 slightly above the flange 10 so that the threads of cap 12 are not entirely home in their engagement with threads 11. Sleeve 6 is then forced down into the upper end portion of tube 4 to a condition where it will not revolve therein, and in this position the tube 14 will outstand away from tube 4 in such relation to the engine that the funnel 15 is exposed usually beyond the plane of the hood, not shown. In this position lubricant may be freely introduced into the funnel 15 without liability of spilling and will find its way through the tube 14 and down into the crank housing. When the required amount of oil has been delivered through the funnel 15, the funnel is merely moved for swinging the tube 14 around alongside the block 1. In swinging the tube 14 to this position, cap 12 is moved angularly proportionately and the threads thereof are brought to a tight relation to the threads 11 so that the parts assume the close fit indicated by the position of the flanges 10 and 13 in Figure 1. This tightening of the threads is sufficient to frictionally resist the vibratory movement of the tube 14, so that during the running of the engine the tube remains in the given out-of-the-way position. At the same time, when more oil is required, it is a simple, easy matter to swing the tube 14 to the outer position, thus unscrewing the threads of the cap 12 say approximately one quarter of a thread and placing the funnel 15 ready to receive the lubricant.

To prevent free access of foreign substances through funnel 15 and tube 14 to the breather tube 4, the funnel 15 is preferably, during the running of the engine, closed by a wooden cover 16 which fits sufficiently snugly within the upper end of the funnel 15 not to vibrate out of place. For breathing purposes, a protected port 17 is preferably formed through the wooden cover 16.

What I claim is:—

1. In lubricating apparatus for enginery, the combination with a crank housing breather tube, of a filler tube connected therewith and having an end open to receive lubricant, the said filler tube being pivotally movable with respect to the breather tube for having its receiving end movable to and from an accessible position.

2. In lubricating apparatus for enginery, the combination with a crank housing breather tube, of a filler tube having a threaded connection therewith and having an end open to receive lubricant, the said filler tube being pivotally movable on its threads with respect to the breather tube for having its receiving end movable to and from an accessible position.

3. In lubricating apparatus for enginery, the combination with a crank housing breather tube, of a filler tube having a threaded connection therewith and having an end open to receive lubricant, the said filler tube being pivotally movable on its threads with respect to the breather tube for having its receiving end movable to and from an accessible position, the threaded engagement of the filler tube being extended to the point and in such relation to the pitch of the threads that the movement of the tube to the accessible position unscrews and loosens the same while movement in the converse direction tightens the threaded connection to the point for frictionally retaining the filler tube in an out-of-the-way position.

4. In lubricating apparatus for enginery, the combination with a crank housing breather tube, of a sleeve extending into the upper end thereof and having means of engagement therewith for preventing angular movement of the sleeve within the tube, and a filler tube movably engaging the sleeve and pivoted to swing on such movable engagement to and from an accessible position.

5. In lubricating apparatus for enginery, the combination with a crank housing breather tube, of a sleeve extending into the upper end thereof and having means of engagement therewith for preventing angular movement of the sleeve within the tube, and a filler tube having a threaded connection with said sleeve, said filler tube being pivotally movable on such threaded connection to and from an accessible position.

6. In lubricating apparatus for enginery, the combination with a crank housing breather tube, of a sleeve extending into the upper end thereof and having means of engagement therewith for preventing angular movement of the sleeve within the tube, and a filler tube movably engaging the sleeve and pivoted to swing on such movable engagement to and from an accessible position, the said sleeve being formed with flutings engaging the inner surface of the breather tube for resisting angular movement of the sleeve.

7. In lubricating apparatus for enginery, the combination with a crank housing breather tube, of a sleeve extending into the upper end thereof and having means of engagement therewith for preventing angular movement of the sleeve within the tube, and a filler tube movably engaging the sleeve and pivoted to swing on such movable engagement to and from an accessible position, said sleeve being formed with a pair of spaced fingers adapted to extend on opposite sides of a transversely located bolt extending through the breather tube.

8. As an article of manufacture, a lubricant filling device comprising a sleeve adapted to fit within a crank housing breather tube, and a filler tube pivotally engaging said sleeve.

9. As an article of manufacture, a lubricant filling device comprising a sleeve adapted to fit within a crank housing breather tube, and a filler tube pivotally engaging said sleeve, said filler tube being formed with angles and having an open free end adapted to receive lubricant, the said filler tube being movable pivotally for moving the said free end to and from an accessible position.

10. As an article of manufacture, a lubricant filling device comprising a sleeve having means of engagement with a crank housing breather tube for preventing angular movement of the sleeve with respect to such tube, and a filler tube pivotally carried by said sleeve.

11. As an article of manufacture, a lubricant filling device comprising a filler tube having a receiving end, and means for pivotally connecting the opposite end to a crank housing breather tube for retaining said filler tube in communication with the breather tube while leaving the same free to swing to and from an accessible position.

12. In lubricating apparatus for enginery, the combination, with parts of enginery to be lubricated, including a crank housing, of a filler tube having its intake end offset relative to its discharge end, and its discharge end communicating with the crank housing, the filler tube being capable of swinging horizontally relatively to the crank housing, and means for quickly-detachably connecting the tube rigidly with respect to the enginery.

13. In lubricating apparatus for mobile enginery, the combination, with the crank housing of such enginery, of a filler tube for the crank housing having its intake end offset relative to its discharge end, the filler tube being capable of being moved about the axis of its discharge end, and means engaging the filler tube and adapted to be rigidly connected to the enginery for preventing relative vibration of the tube during movement of the enginery.

In testimony whereof I affix my signature.

CHARLES L. MAGEE.